United States Patent
Nakata et al.

(10) Patent No.: US 10,431,380 B2
(45) Date of Patent: Oct. 1, 2019

(54) BIAXIALLY STRETCHED POLYPROPYLENE FILM FOR CAPACITOR

(71) Applicant: OJI HOLDINGS CORPORATION, Tokyo (JP)

(72) Inventors: Masahiro Nakata, Tokyo (JP); Kazuo Ikeda, Tokyo (JP); Tadakazu Ishiwata, Tokyo (JP); Akihiro Kakehi, Tokyo (JP); Yoshinori Matsuo, Tokyo (JP); Yuichi Shishido, Tokyo (JP); Shigeo Murase, Tokyo (JP)

(73) Assignee: OJI HOLDINGS CORPORATION, Tokyo (JP)

( * ) Notice: Subject to any disclaimer, the term of this patent is extended or adjusted under 35 U.S.C. 154(b) by 179 days.

(21) Appl. No.: 15/514,850

(22) PCT Filed: Sep. 30, 2014

(86) PCT No.: PCT/JP2014/076067
§ 371 (c)(1),
(2) Date: Mar. 28, 2017

(87) PCT Pub. No.: WO2016/051496
PCT Pub. Date: Apr. 7, 2016

(65) Prior Publication Data
US 2017/0229243 A1    Aug. 10, 2017

(51) Int. Cl.
| | | |
|---|---|---|
| *H01G 4/18* | (2006.01) | |
| *B32B 3/30* | (2006.01) | |
| *C08J 5/18* | (2006.01) | |
| *B32B 27/32* | (2006.01) | |
| *C08K 5/13* | (2006.01) | |
| *C08L 23/10* | (2006.01) | |
| *C08L 23/14* | (2006.01) | |
| *H01G 4/32* | (2006.01) | |

(52) U.S. Cl.
CPC .................. *H01G 4/18* (2013.01); *B32B 3/30* (2013.01); *B32B 27/32* (2013.01); *C08J 5/18* (2013.01); *C08K 5/13* (2013.01); *C08L 23/10* (2013.01); *C08L 23/14* (2013.01); *H01G 4/32* (2013.01); *B32B 2307/518* (2013.01); *B32B 2307/538* (2013.01); *B32B 2309/105* (2013.01); *B32B 2457/16* (2013.01); *C08J 2323/12* (2013.01); *C08J 2423/12* (2013.01); *C08L 2203/16* (2013.01); *C08L 2205/025* (2013.01)

(58) Field of Classification Search
CPC ... H01G 4/18; H01G 4/32; C08K 5/13; B32B 3/30; B32B 27/32; B32B 2309/105; B32B 2457/16; B32B 2307/518; B32B 2307/538; C08L 23/14; C08L 23/10; C08L 2205/025; C08J 5/18; C08J 2323/12; C08J 2423/12

See application file for complete search history.

(56) References Cited

U.S. PATENT DOCUMENTS

| | | |
|---|---|---|
| 9,548,160 B2 | 1/2017 | Ishiwata et al. |
| 2007/0110974 A1 | 5/2007 | Ishiwata et al. |
| 2015/0140266 A1 | 5/2015 | Ishiwata et al. |

FOREIGN PATENT DOCUMENTS

| | | | | |
|---|---|---|---|---|
| EP | 3 127 945 A1 | | 2/2017 | |
| EP | 3 163 592 A1 | | 5/2017 | |
| JP | 59-211908 A | | 11/1984 | |
| JP | 3-070114 A | | 3/1991 | |
| JP | 06342738 A | * | 12/1994 | |
| JP | 10-119127 A | | 5/1998 | |
| JP | 2004-175932 A | | 6/2004 | |
| JP | 2007-137988 A | | 6/2007 | |
| JP | 2007-246898 A | | 9/2007 | |
| JP | 2009-57473 A | | 3/2009 | |
| JP | 2010-254868 A | | 11/2010 | |
| JP | 4653852 B2 | * | 3/2011 | ............. C08J 5/18 |
| WO | 2009/060944 A1 | | 5/2009 | |
| WO | 2013/105552 A1 | | 7/2013 | |

OTHER PUBLICATIONS

Translation to English JP 4653852 B2. accessed Jan. 25, 2019. (Year: 2011).*
Translation to English JP 06-342738 A. accessed Jan. 25, 2019. (Year: 1994).*
International Search Report of PCT/JP2014/076067, dated Nov. 11, 2014. [PCT/ISA/210].
Supplementary Extended European Search Report dated Jan. 26, 2018 from the European Patent Office in counterpart EP Application No. 14903327.6.

* cited by examiner

*Primary Examiner* — Nancy R Johnson
(74) *Attorney, Agent, or Firm* — Sughrue Mion, PLLC

(57) ABSTRACT

Provided is a biaxially stretched polypropylene film for capacitors having a thin thickness and having excellent initial voltage resistance and excellent long-term heat resistance and voltage resistance, and also provided is a metallized polypropylene film for capacitors. The polypropylene film for capacitors is obtained by biaxially stretching a polypropylene resin, the polypropylene film having a crystallite size of 122 Å or less as determined by the Scherrer's equation from the half width of the reflection peak from (040) plane of α-crystal measured by a wide angle X-ray diffraction method, and the polypropylene film having a value of birefringence $\Delta$Nyz with respect to a thickness direction of $7.0\times10^{-3}$ or more and $10.0\times10^{-3}$ or less as measured by an optical birefringence measurement.

9 Claims, No Drawings

BIAXIALLY STRETCHED POLYPROPYLENE FILM FOR CAPACITOR

CROSS REFERENCE TO RELATED APPLICATIONS

This application is a National Stage of International Application No. PCT/JP2014/076067 filed Sep. 30, 2014, the contents of all of which are incorporated herein by reference in their entirety.

TECHNICAL FIELD

The present invention relates to a polypropylene film for capacitors having high dielectric breakdown voltage even when the thickness of the film is reduced. More specifically, the present invention relates to a biaxially stretched polypropylene film that can be suitably used for a long period of time as a high-capacitance capacitor to which a high voltage is applied at a high temperature, even when the film is thin.

BACKGROUND ART

Biaxially stretched polypropylene films are used for electronic and electrical devices. Due to their excellent electrical properties, such as voltage resistance and low dielectric loss, as well as their high moisture resistance, these films are widely used as dielectric films for capacitors, such as high-voltage capacitors; filter capacitors, including various switching power supplies, converters, and inverters; and smoothing capacitors.

In recent years, capacitors have been required to have a smaller size and a higher capacitance. In order to increase the capacitance of a capacitor without changing the volume of the capacitor, it is necessary to reduce the volume of the film, that is, to make the film thin. Therefore, thinner films are required.

Further, polypropylene films are beginning to be widely used as capacitors for inverter power supplies that control drive motors of electric cars, hybrid cars, etc.

Capacitors for inverter power supplies used in cars etc. are required to have a small size, a light weight, a high capacitance, and long-term high voltage resistance (i.e., maintenance of capacitance) in a wide temperature range of −40° C. to 90° C.

For example, PTL 1 discloses that a polypropylene film with a high isotacticity can be formed by controlling the isotacticity and stereoregularity of the polypropylene film within a specific range that has high stereoregularity. PTL 1 also discloses that the heat shrinkage factor of a biaxially oriented polypropylene film is normalized using suitable film-forming conditions to improve dielectric breakdown resistance at a high temperature, and that a capacitor that is prevented from undergoing long-term degradation at a high temperature can be obtained (see claim 1 and paragraph [0013] of PTL 1).

Further, PTL 2 discloses a biaxially oriented polypropylene film having a base layer with pearskin-like irregularities on at least one surface of the film and having specific surface properties such that the ten-point average roughness (Rz) of the surface is 0.50 to 1.50 µm, and the surface gloss is 90 to 135%, wherein the film has excellent processing suitability even when the film is thin, and the film has high voltage resistance in a temperature range of −40° C. to 90° C. (see claim 1 and paragraph [0020] of PTL 2).

Generally speaking, however, if stereoregularity increases, crystallinity also increases, and stretchability decreases; therefore, the film is easily broken during stretching, and high stereoregularity is not preferable in terms of production. Furthermore, PTL 1 and PTL 2 are not sufficient for recent extremely severe requirements for capacitors.

In order to reduce the thickness of the film, it is also necessary to increase the stretchability of the polypropylene resin and cast sheet. However, increased stretchability generally conflicts with improvement of voltage resistance due to increase in stereoregularity and crystallinity, as stated above.

PTL 3 discloses a cast sheet using a polypropylene resin having a specific weight average molecular weight, a specific molecular weight distribution, and a specific stereoregularity, wherein the sheet has a β-crystal fraction that is controlled within a relatively low specific range. PTL 3 also discloses that a biaxially stretched film with a thin film thickness having excellent processing suitability and high voltage resistance can be produced from this sheet (see claim 1, paragraphs [0001] and [0015], etc., of PTL 3). However, there is room for improvement in order to satisfy recent severe requirements relating to voltage resistance at high temperatures.

PTL 4 discloses that a thin polypropylene film having high voltage resistance, without having high stereoregularity, can be obtained by causing the film to have a relatively high crystallinity, to contain a specific molecular weight component, and to have a specific molecular weight distribution due to the component. However, PTL 4 is silent about recent severe requirements relating to voltage resistance at high temperatures.

PTL 5 discloses a polypropylene sheet with a high β-crystal fraction using, as a raw material, a polypropylene resin having a specific melt flow rate, specific Mn, specific Mw/Mn, and specific Mz/Mn, as well as having a specific stereoregularity index. Effects relating to β-crystal formation and moldability have been improved by adjusting the melt flow rate etc. within a specific range; however, there is room for improvement in order to satisfy recent high heat resistance and high voltage resistance.

PTL 6 discloses a polypropylene film with a high β-crystal fraction produced from a polypropylene resin having a broad molecular weight distribution using a simple one-step method. However, PTL 6 is still not sufficient to obtain a thin film having higher voltage resistance and satisfying recent severe requirements.

Since the capacitor industry is rapidly progressing, there is a demand for smaller capacitors, that is, even thinner films. In addition, there is a demand for polypropylene films having more excellent initial voltage resistance and being usable for a longer period of time, that is, excellent long-term voltage resistance. However, existing capacitors do not satisfy these demands.

CITATION LIST

Patent Literature

PTL 1: JPH10-119127A (pages 2-5)
PTL 2: JP2007-246898A (pages 5-7)
PTL 3: JP2007-137988A (pages 2-4)
PTL 4: WO2009-060944 (pages 3-11)
PTL 5: JP2004-175932A (pages 2-4)
PTL 6: JP2009-57473A (pages 2-3)

SUMMARY OF INVENTION

Technical Problem

An object of the present invention is to provide a biaxially stretched polypropylene film for capacitors having a high dielectric breakdown voltage, and preferably having a thin thickness, for obtaining a capacitor that has excellent long-term heat resistance and voltage resistance (less reduction in capacitance). Another object is to provide a metallized polypropylene film for such capacitors. Still another object is to provide a capacitor using such a polypropylene film.

Solution to Problem

The present inventors conducted extensive research to solve the above problems, and surprisingly found that a biaxially stretched polypropylene film having a crystallite size controlled to a specific size or less showed a high dielectric breakdown voltage at a high temperature, even when the film was thin, and that the film, when used as a capacitor, thereby had excellent long-term heat resistance and voltage resistance. Thus, the present invention has been completed.

More specifically, in one aspect, the present invention provides a biaxially stretched polypropylene film for capacitors, obtained by biaxially stretching a polypropylene resin, the polypropylene film having a crystallite size of 122 Å or less as determined by the Scherrer's equation from the half width of the reflection peak from (040) plane of α-crystal measured by a wide angle X-ray diffraction method, and the polypropylene film having a value of birefringence ΔNyz with respect to a thickness direction of $7.0 \times 10^{-3}$ or more and $10.0 \times 10^{-3}$ or less as measured by an optical birefringence measurement.

In a preferred embodiment, the present invention provides the above polypropylene film, wherein the polypropylene film has protrusions, and when a surface shape measurement is carried out on at least one surface of the polypropylene film in a visual field of 240 μm×180 μm by using a light interferometric non-contact surface profiler, the total volume of protrusions having a height of 0.02 μm or more is 10 μm$^3$ or more and 120 μm$^3$ or less per visual field.

In one embodiment, the present invention provides the above polypropylene film, wherein the polypropylene resin contains a polypropylene resin A, and the polypropylene resin A has the following characteristics:

a weight average molecular weight (Mw) of 250,000 or more and 450,000 or less;

a molecular weight distribution (Mw/Mn) of 7.0 or more and 12.0 or less;

a ratio of Z-average molecular weight/number average molecular weight (Mz/Mn) of 20.0 or more and 70.0 or less;

a difference, as obtained by subtracting a differential distribution value when the logarithmic molecular weight Log(M)=6.0 from a differential distribution value when Log(M)=4.5 on a molecular weight distribution curve, of 8.0% or more and 18.0% or less; and a mesopentad fraction ([mmmm]) of 94.0% or more and less than 98.0%.

In another embodiment, the present invention provides the above polypropylene film, wherein the polypropylene resin further contains a polypropylene resin B, and the polypropylene resin B has the following characteristics:

a Mw of 300,000 or more and 400,000 or less;

a Mw/Mn of 7.0 or more and 9.0 or less; and a difference, as obtained by subtracting a differential distribution value when the logarithmic molecular weight Log(M)=6.0 from a differential distribution value when Log(M)=4.5 on a molecular weight distribution curve, of 1.0% or more and less than 8.0%; and wherein the polypropylene resin B is contained in an amount of 10 wt. % or more and 45 wt. % or less, based on 100 wt. % of the entire polypropylene resin.

In a preferred embodiment, the present invention provides the above polypropylene film having a thickness of 1.0 μm or more and 6.0 μm or less.

In a further embodiment, the present invention provides the above polypropylene film, wherein the polypropylene film contains at least one hindered phenol-based antioxidant having a carbonyl group, and the content of the antioxidant in the film is 4,000 ppm by mass or more and 6,000 ppm by mass or less, based on 100 parts by weight of the polypropylene resin.

In still another embodiment, the present invention provides the above polypropylene film, wherein at least one side of the polypropylene film has a surface roughness such that the center line average roughness (Ra) is 0.03 μm or more and 0.08 μm or less, and the maximum height (Rz) is 0.3 μm or more and 0.8 μm or less.

In a further embodiment, the present invention provides the above polypropylene film, wherein the polypropylene resin that constitutes the polypropylene film contains a long-chain branched polypropylene (a branched polypropylene, hereinafter also referred to as "polypropylene resin C").

In another aspect, the present invention provides a metallized polypropylene film for capacitors, comprising the above biaxially stretched polypropylene film for capacitors, wherein a metal is deposited on one side or both sides of the polypropylene film.

In a preferred aspect, the present invention provides a capacitor produced using the above metallized polypropylene film for capacitors.

Advantageous Effects of Invention

The biaxially stretched polypropylene film for capacitors of the present invention has a crystallite size of 122 Å or less as determined by the Scherrer's equation from the half width of the reflection peak from (040) plane of α-crystal measured by a wide angle X-ray diffraction method, and has a value of birefringence ΔNyz with respect to a thickness direction of $7.0 \times 10^{-3}$ or more and $10.0 \times 10^{-3}$ or less as measured by an optical birefringence measurement; therefore, the film itself has a high dielectric breakdown voltage even at a high temperature. This enables the production of a capacitor that has less reduction in capacitance even when a high direct-current voltage is applied thereto at a high temperature for a long period of time, and that has excellent long-term heat resistance and voltage resistance. Preferably, a thinner capacitor can be obtained.

When the total volume of protrusions having a height of 0.02 μm or more is 10 μm$^3$ or more and 120 μm$^3$ or less per visual field when a surface shape measurement is carried out on at least one surface of the polypropylene film in a visual field of 240 μm×180 μm by using a light interferometric non-contact surface profiler, a capacitor having enhanced long-term voltage resistance can be obtained.

When the polypropylene film contains at least one hindered phenol-based antioxidant having a carbonyl group, and the content of the antioxidant in the film is 4,000 ppm by mass or more and 6,000 ppm by mass or less, based on 100 parts by weight of the polypropylene resin, the oxidation degradation effect of the polypropylene film is prevented, and the long-term durability of the film used as a capacitor can be further improved.

When at least one side of the polypropylene film has a surface roughness such that the center line average roughness (Ra) is 0.03 μm or more and 0.08 μm or less, and the maximum height (Rz) is 0.3 μm or more and 0.8 μm or less, the element-winding suitability of the polypropylene film is improved, and uniform contact is formed between the films when the film is wound. Therefore, the voltage resistance (high dielectric breakdown voltage) and the long-term voltage resistance can be further improved.

As described above, the present invention can effectively realize an increase in the temperature at which a polypropylene film capacitor can be used, an increase in the rated voltage, an extension of the life (long-term durability), and a smaller size and a higher capacity.

DESCRIPTION OF EMBODIMENTS

The "biaxially stretched polypropylene film for capacitors" according to the present invention is a polypropylene film obtained by biaxially stretching a polypropylene resin, and has the following two features:

(1) the polypropylene film has a crystallite size of 122 Å or less as determined by the Scherrer's equation from the half width of the reflection peak from (040) plane of α-crystal measured by a wide angle X-ray diffraction method; and (2) the polypropylene film has a value of birefringence ΔNyz with respect to a thickness direction of $7.0 \times 10^{-3}$ or more and $10.0 \times 10^{-3}$ or less as measured by an optical birefringence measurement.

Further, in addition to the above two features, the "biaxially stretched polypropylene film for capacitors" according to the present invention preferably has the following feature:

(3) the polypropylene film has protrusions, and when a surface shape measurement is carried out on at least one surface of the polypropylene film in a visual field of 240 μm×180 μm by using a light interferometric non-contact surface profiler, the total volume of protrusions having a height of 0.02 μm or more is 10 μm³ or more and 120 μm³ or less per visual field.

In the present invention, the "crystallite size" of the polypropylene film refers to a crystallite size determined by the Scherrer's equation, described later, using the reflection peak from (040) plane of α-crystal of the polypropylene film measured by a wide angle X-ray diffraction method (XRD method). The crystallite size is 122 Å or less, and preferably 120 Å or less. Moreover, the crystallite size is preferably 100 Å or more, more preferably 110 Å or more, and particularly preferably 115 Å or more. Therefore, the crystallite size is more preferably 110 Å or more and 120 Å or less, and particularly preferably 115 Å or more and 120 Å or less. As the crystallite size is smaller, the leakage current is smaller, and structural damage by Joule heating is less likely to occur. Consequently, the heat resistance, voltage resistance, long-term heat resistance, and long-term voltage resistance can be preferably improved. However, in terms of mechanical strength etc., and in consideration of the lamellar (folded crystal) thickness of the high-molecular-weight chain, the lower limit of the crystallite size is generally considered to be around 100 Å.

The "crystallite size" of the polypropylene film of the present invention was specifically determined in the following manner. First, the biaxially stretched polypropylene film and its metallized film were subjected to wide angle X-ray diffraction measurement, and the half width of the diffraction reflection peak from (040) plane of α-crystal of the obtained isotactic polypropylene was determined. Next, the crystallite size was calculated using the Scherrer's equation (equation (1)):

$$D = K \times \lambda / (\beta \times \cos\theta) \qquad \text{Equation (1):}$$

wherein D is the crystallite size (Å), K is the constant (shape factor), λ is the wavelength (Å) of the X rays used, β is the half width of the diffraction reflection peak from (040) plane of α-crystal, and θ is the diffraction Bragg angle of the (040) plane of α-crystal.

In the present invention, a MiniFlex300 (trade name, produced by Rigaku Corporation) desktop X-ray diffractometer was specifically used to measure the diffraction reflection peak from (040) plane of α-crystal. The X-rays used were generated at an output of 30 kV and 10 mA. CuKα rays (wavelength: 1.5418 Å) monochromatized by graphite monochromator were collimated by a slit, and applied to the measurement film. The diffraction intensity was measured using a scintillation counter by 2θ/θ continuous scanning using a goniometer. The half width of the reflection peak from (040) plane of α-crystal was determined from the obtained data using PDXL, integrated X-ray powder diffraction software originally bundled with the apparatus.

As a result of the above measurement, the crystallite size can be determined by the Scherrer's equation (1) using the θ and half width of the obtained diffraction reflection peak. In the present invention, the shape factor constant K is 0.94, and λ is 1.5418 Å.

In general, the crystallite size can be controlled by the cooling conditions, stretching conditions, etc., during formation of a cast stock. The crystallite size tends to be smaller at a lower cast temperature, and the crystallite size is smaller at a higher stretch ratio.

In the present invention, the "value of birefringence ΔNyz" with respect to the thickness direction of the polypropylene film refers to a value of birefringence ΔNyz with respect to the thickness direction measured by an optical birefringence measurement. More specifically, the value of birefringence ΔNyz is obtained in the following manner. The main axes in the in-plane direction of the film are regarded as the x-axis and the y-axis, and the thickness direction (normal direction relative to the in-plane direction) of the film is regarded as the z-axis. Of the in-plane direction axes, the slow axis having a higher refractive index is regarded as the x-axis. A value obtained by subtracting a three-dimensional refractive index in the z-axial direction from a three-dimensional refractive index in the y-axial direction is the value of birefringence ΔNyz.

The value of birefringence ΔNyz can be used as the index of film orientation intensity. When the film orientation intensity is high, the three-dimensional refractive index in the y-axial direction, which is an in-plane refractive index, is higher, and the three-dimensional refractive index in the z-axial direction, which is the refractive index in the thickness direction, is lower. Thus, the value of birefringence ΔNyz becomes large.

The value of birefringence ΔNyz with respect to the thickness direction of the biaxially stretched polypropylene film for capacitors of the present invention is $7.0 \times 10^{-3}$ or more and $10.0 \times 10^{-3}$ or less, preferably $7.0 \times 10^{-3}$ or more and $9.0 \times 10^{-3}$ or less, and more preferably $7.5 \times 10^{-3}$ or more and $9.0 \times 10^{-3}$ or less. If the value of birefringence ΔNyz is lower than $7.0 \times 10^{-3}$, the orientation of the film is not sufficient, and the voltage resistance and the long-term voltage resistance are also insufficient. On the other hand, in terms of film-forming properties, it is considered to be difficult to obtain a highly oriented film having a value of birefringence ΔNyz of higher than $10.0 \times 10^{-3}$.

In the present invention, a RE-100 retardation measuring device (produced by Otsuka Electronics Co., Ltd.) was specifically used to measure the "value of birefringence ΔNyz" with respect to the thickness direction of the polypropylene film. Retardation (phase difference) was measured by a gradient method. More specifically, the main axes in the in-plane direction of the film were regarded as the x-axis and the y-axis, and the thickness direction (normal direction relative to the in-plane direction) of the film was regarded as the z-axis. Of the in-plane direction axes, the slow axis having a higher refractive index was regarded as the x-axis. A retardation value when the x-axis, which served as an inclined axis, was inclined within the range of 0° to 50° relative to the z-axis was determined. Birefringence ΔNyz in the y-axial direction with respect to the thickness direction (z-axial direction) was calculated from the obtained retardation value using the method described in the non-patent document "Yutaka AWAYA, Guide for polarization microscope of high-molecular-weight material, pp. 105-120, 2001." For example, in a sequential stretching method, when the stretch ratio in the TD direction (transverse direction) is higher than the stretch ratio in the MD direction (machine direction), the TD direction serves as the slow axis (x-axis), and the MD direction serves as the y-axis.

When the polypropylene film is oriented in the plane direction, the refractive index Nz in the thickness direction changes to increase the birefringence ΔNyz, and the voltage resistance is improved (dielectric breakdown voltage is increased). The reason for this is considered to be as follows. When the molecular chains of polypropylene are oriented in the plane direction, the refractive index Nz in the thickness direction becomes low. The electrical conductivity in the film-thickness direction is a transfer between the molecular chains, and is therefore low. Accordingly, when the molecular chains of polypropylene are not oriented in the plane direction (when the birefringence ΔNyz is small), the electrical conductivity can be a transfer between the molecular chains; thus, it is considered that the voltage resistance is improved as compared with a case in which the polypropylene molecule chains are oriented in the plane direction (the birefringence ΔNyz is large).

In general, the "value of birefringence ΔNyz" can be controlled by changing the film-forming conditions (e.g., increasing the stretch ratio) to thereby change the orientation of the polypropylene molecule chains. Moreover, the "value of birefringence ΔNyz" can also be controlled by changing the properties of the polypropylene resin.

In the present invention, the "total volume of protrusions having a height of 0.02 μm or more" on the surface of the polypropylene film is the total volume of protrusions having a height of 0.02 μm or more observed when a surface shape measurement is carried out in a visual field of 240 μm×180 μm by using a light interferometric non-contact surface profiler. The total volume of the protrusions is 10 μm$^3$ or more and 120 μm$^3$ or less per visual field.

Therefore, at least one surface of the biaxially stretched polypropylene film for capacitors of the present invention is preferably a finely roughened surface in which the total volume of protrusions having a height of 0.02 μm or more is 10 μm$^3$ or more and 120 μm$^3$ or less per visual field, more preferably 10 μm$^3$ or more and 100 μm$^3$ or less per visual field, even more preferably 10 μm$^3$ or more and 80 μm$^3$ or less per visual field, and particularly preferably 10 μm$^3$ or more and 50 μm$^3$ or less per visual field.

The total volume of protrusions is preferably lower, because the long-term voltage resistance tends to be improved. However, a total volume of protrusions of smaller than 10 μm$^3$ per visual field is not preferable, because the surface is overly smooth, sliding properties are reduced, winding properties (including winding of the capacitor element) are thus reduced, wrinkles are easily formed during winding processing, and productivity is reduced. Further, the voltage resistance of the capacitor may also be reduced. On the other hand, when the total volume of protrusions is greater than 120 μm$^3$, a moderate space is formed between the films during winding processing and capacitor processing, and wrinkles are less likely to form. However, the interlayer space between the films becomes large, thereby reducing the weight per thickness, and reducing the voltage resistance and long-term voltage resistance. Thus, a total volume of protrusions of greater than 120 μm$^3$ is not preferable.

When the total volume of protrusions having a height of 0.02 μm or more on the film surface is 10 μm$^3$ or more and 120 μm$^3$ or less per visual field, the biaxially stretched polypropylene film for capacitors of the present invention has a finely roughened surface. When the film is processed into a capacitor, winding wrinkles are not formed during element-winding processing, and the film can be optimally wound. As a result, uniform contact is formed between the films, thereby improving the voltage resistance (high dielectric breakdown voltage) and long-term voltage resistance.

The "total volume of protrusions having a height of 0.02 μm or more" in the present invention was specifically determined by measuring the surface shape using a light interferometric non-contact surface profiler by a three-dimensional surface roughness evaluation method. According to the "three-dimensional surface roughness evaluation method," the height of the entire film surface is evaluated; thus, the space between the films can be evaluated three-dimensionally. Therefore, local minute changes and variations of the measuring object surface can be grasped, and more accurate surface roughness can be evaluated. The space between the films was evaluated using the total volume of three-dimensional protrusions, rather than the simple height of protrusions (two-dimensional surface roughness evaluation using general center line average roughness Ra etc.). More excellent voltage resistance and long-term voltage resistance could be obtained.

More specifically, the total volume of protrusions having a height of 0.02 μm or more in the present invention was measured using a "VertScan 2.0 (model: R5500GML)" produced by Ryoka Systems Inc. as a light interferometric non-contact surface profiler. The measurement was performed in WAVE mode using a 530 white filter and a ×20 objective lens in 10 randomly selected portions of the film surface in a visual field of 240 μm×180 μm. After the obtained data were subjected to noise cancellation processing by a median filter, Gaussian filtering with a cutoff value of 30 μm was performed to remove waviness components. The roughened surface was thereby brought into a state suitable for proper measurement.

The total volume of protrusions having a height of 0.02 μm or more was determined in the following manner using the "Bearing" plug-in function of "VS-Viewer" analysis software of "VertScan2.0." More specifically, the "mountain-side height threshold" was set as a predetermined height (i.e., 0.02 μm), and then a value displayed as the "mountain-side volume" was the total volume of protrusions per visual field. This measurement was performed in 10 portions, and their average value was determined as the total volume of protrusions per visual field.

The total volume of protrusions having a height of 0.02 μm or more in the present invention can be achieved by a known surface-roughening method, such as embossing or etching. Further, it is preferable to use a surface-roughening method using β crystals, which does not require mixing of impurities. The proportion of β crystals can be controlled by changing the properties of the polypropylene resin to be used, such as the molecular structure. The proportion of β crystals can also be controlled by the stretching conditions, such as cast temperature and cast speed. Furthermore, the melting ratio of β crystals can be controlled by the roll temperature in the longitudinal stretching step. The surface properties can be controlled by selecting the optimal production conditions for two parameters, i.e., β-crystal formation and melting.

The biaxially stretched polypropylene film for capacitors of the present invention preferably has a thickness of 1.0 μm or more and 6.0 μm or less, more preferably 1.5 μm or more and 4.0 μm or less, particularly preferably 1.8 μm or more and 3.5 μm or less, and most preferably 1.8 μm or more and less than 3.0 μm. The biaxially stretched polypropylene film for capacitors of the present invention is preferably a film with an extremely thin thickness.

The thickness of the biaxially stretched polypropylene film for capacitors of the present invention is a value measured according to JIS-C2330 using a micrometer (JIS-B7502).

The biaxially stretched polypropylene film of the present invention can be obtained by biaxially stretching a polypropylene resin. The polypropylene resin may contain only one kind of polypropylene resin, or two or more kinds of polypropylene resins.

The polypropylene resin preferably contains a polypropylene resin A. The weight average molecular weight of the polypropylene resin A is 250,000 or more and 450,000 or less, and preferably 250,000 or more and 400,000 or less.

Since the weight average molecular weight of the polypropylene resin A is 250,000 or more and 450,000 or less, resin flowability is moderate, the thickness of the cast sheet (extruded sheet) is easily controlled, and a thin stretched film can be easily produced. Further, the thickness of the sheet and film is less likely to be uneven, and the sheet can have moderate stretchability. Thus, it is preferable that the weight average molecular weight of the polypropylene resin A is 250,000 or more and 450,000 or less.

The polypropylene resin A has a molecular weight distribution (weight average molecular weight/number average molecular weight (Mw/Mn)) of 7.0 or more and 12.0 or less, preferably 7.5 or more and 12.0 or less (Mw/Mn), and more preferably 7.5 or more and 11.0 or less (Mw/Mn).

Further, the polypropylene resin A has a molecular weight distribution (Z-average molecular weight/number average molecular weight (Mz/Mn)) of 20.0 or more and 70.0 or less, preferably 25.0 or more and 60.0 or less, and more preferably 25.0 or more and 50.0 or less.

The polypropylene resin preferably contains the polypropylene resin A in an amount of 50 wt. % or more and 90 wt. % or less, more preferably 55 wt. % or more and 85 wt. % or less, and particularly preferably 60 wt. % or more and 80 wt. % or less, based on 100 wt. % of the entire polypropylene resin.

The weight average molecular weight (Mw), number average molecular weight (Mn), Z-average molecular weight, and molecular weight distributions (Mw/Mn and Mz/Mn) of the polypropylene resin can be measured by a gel permeation chromatography (GPC) apparatus. More specifically, these can be measured by, for example, a HLC-8121GPC-HT high-temperature GPC apparatus with a built-in differential refractometer (RI) (trade name, produced by Tosoh Corporation). The GPC columns used were three coupled TSKgel GMHHR-H(20)HT columns (produced by Tosoh Corporation). The measured values of Mw and Mn were obtained by setting the column temperature to 140° C., and flowing trichlorobenzene as an eluate at a flow rate of 1.0 ml/10 min. A calibration curve of the molecular weight M of polystyrene standard (produced by Tosoh Corporation) was prepared, and the measured values were converted into polystyrene values to thereby obtain Mw, Mn, and Mz. Further, the base-10 logarithm of the molecular weight M of polystyrene standard is referred to as "logarithmic molecular weight (Log(M))."

The polypropylene resin A has a difference, as obtained by subtracting a differential distribution value when the logarithmic molecular weight Log(M)=6.0 from a differential distribution value when Log(M)=4.5 on a molecular weight distribution curve, of 8.0% or more and 18.0% or less, preferably 10.0% or more and 17.0% or less, and more preferably 12.0% or more and 16.0% or less, based on 100% of the differential distribution value when Log(M)=6.0.

When the amount of components in which the logarithmic molecular weight Log(M)=4.5, which is used as a typical distribution value of components having a molecular weight of 10,000 to 100,000 (hereinafter also referred to as "low-molecular-weight components"), which is lower than the Mw (250,000 to 450,000) of the polypropylene resin A, is compared with the amount of components in which Log(M) =around 6.0, which is a typical distribution value of components having a molecular weight of about 1,000,000 (hereinafter also referred to as "high-molecular-weight components"), which is higher than the Mw of the polypropylene resin A, it is understood that the amount of the low-molecular-weight components is larger by 8.0% or more and 18.0% or less.

That is, the molecular weight distribution Mw/Mn of 7.0 to 12.0 merely indicates the size of the molecular weight distribution; the quantitative relationship between the high-molecular-weight components and the low-molecular-weight components therein is unknown. Accordingly, it is preferable that the polypropylene resin A of the present invention has a broad molecular weight distribution, and contains components having a molecular weight of 10,000 to 100,000 in an amount larger by 8.0% or more and 18.0% or less than the amount of components having a molecular weight of 1,000,000.

Since the polypropylene resin A has a difference, as obtained by subtracting a differential distribution value when the logarithm molecular weight Log(M)=6.0 from a differential distribution value when Log(M)=4.5, of 8.0% or more and 18.0% or less, based on 100% of the differential distribution value when Log(M) is 6.0, the polypropylene resin A contains low-molecular-weight components in an amount larger by 8.0% or more and 18.0% or less than the amount of high-molecular-weight components. Therefore, the crystallite size is smaller, and it is easier to obtain a roughened surface with desired orientation, which is preferable.

The differential distribution values can be obtained by GPC in the following manner. A time-intensity curve (generally called an "elution curve") obtained by a differential refractometer (RI) of GPC is used. Using a calibration curve obtained from polystyrene standard, the time axis is converted into the logarithm molecular weight (Log(M)) to thereby convert the elution curve into a curve showing the intensity with respect to Log(M). Since the RI detected intensity is proportional to the component concentration, an integral distribution curve with respect to the logarithmic molecular weight Log(M) can be obtained when the total area of the intensity curve is regarded as 100%. A differential distribution curve can be obtained by differentiating the integral distribution curve by Log(M). Thus, the "differential distribution" means the differential distribution of the concentration fraction with respect to the molecular weight. The relationship according to the present invention can be obtained by reading the differential distribution value at a specific Log(M) from this curve.

The mesopentad fraction ([mmmm]) of the polypropylene resin A is 94.0% or more and less than 98.0%, and preferably 95.0% or more and 97.0% or less.

When the mesopentad fraction [mmmm] is 94.0% or more and less than 98.0%, the crystallinity of the resin is moderately improved due to the moderately high stereoregularity, and the initial voltage resistance and the long-term voltage resistance tend to be moderately improved. Furthermore, the solidification (crystallization) rate during molding of the cast sheet is moderate, resulting in moderate stretchability.

The mesopentad fraction [mmmm] refers to an index of stereoregularity that can be obtained by high-temperature nuclear magnetic resonance (NMR) spectroscopy. Specifically, the mesopentad fraction can be measured by, for example, a JNM-ECP500 high-temperature transform nuclear magnetic resonance system (high-temperature FT-NMR; produced by JEOL Ltd.). The observed nucleus is $^{13}C$ (125 MHz), the measurement temperature is 135° C., and o-dichlorobenzene (ODCB: a mixed solvent of ODCB and deuterated ODCB (mixing ratio=4/1)) can be used as the solvent. High-temperature NMR measurement can be carried out by, for example, the method described in "Polymer Analysis Handbook, New Edition, Japan Society for Analytical Chemistry, Research Committee of Polymer Analysis, Kinokuniya Company Ltd., 1995, p. 610."

The measurement mode is single-pulse proton broadband decoupling, the pulse width is 9.1 μsec (45° pulse), the pulse interval is 5.5 sec, the number of integrations is 4500, and the shift reference is $CH_3$ (mmmm)=21.7 ppm.

Pentad fraction, which represents stereoregularity, is calculated as the percentage of the integrated value of the intensity of each signal derived from a combination of pentads (e.g., "mmmm" or "mrrm") arranged in the same direction (meso (m)) and arranged in different directions (racemo (r)). The assignment of each signal derived from "mmmm," "mrrm," or the like can be determined by referring to, for example, "T. Hayashi, et al., Polymer, Vol. 29, p. 138 (1988)."

The polypropylene resin can contain a polypropylene resin B, in addition to the polypropylene resin A.

The polypropylene resin B has a Mw of 300,000 or more and 400,000 or less; a Mw/Mn of 7.0 or more and 9.0 or less; and a difference, as obtained by subtracting a differential distribution value when the logarithmic molecular weight Log(M)=6.0 from a differential distribution value when Log(M)=4.5 on a molecular weight distribution curve, of 1.0% or more and less than 8.0%.

The Mw of the polypropylene resin B is 300,000 or more and 400,000 or less, more preferably 330,000 or more and 380,000 or less.

The Mw/Mn of the polypropylene resin B is 7.0 or more and 9.0 or less, and preferably 7.5 or more and 8.5 or less.

The polypropylene resin B preferably has a difference, as obtained by subtracting a differential distribution value when the logarithm molecular weight Log(Mw)=6 from a differential distribution value when Log(Mw)=4.5 on a molecular weight differential distribution curve, of 1.0% or more and less than 8.0%, preferably 3.0% or more and 7.5% or less, and more preferably 5.0% or more and 7.5% or less, based on 100% of the differential distribution value when Log(Mw)=6.

The polypropylene resin B preferably has a molecular weight distribution (Z-average molecular weight/number average molecular weight (Mz/Mn)) of 20.0 or more and 70.0 or less, more preferably 25.0 or more and 60.0 or less, and particularly preferably 25.0 or more and 50.0 or less.

The mesopentad fraction ([mmmm]) of the polypropylene resin B is preferably 94.0% or more and less than 98.0%, and more preferably 95.0% or more and 97.0% or less.

The polypropylene resin preferably contains the polypropylene resin B in an amount of 10 wt. % or more and 50 wt. % or less, more preferably 15 wt. % or more and 45 wt. % or less, and particularly preferably 20 wt. % or more and 40 wt. % or less, based on 100 wt. % of the entire polypropylene resin.

When the polypropylene resin contains the polypropylene resins A and B, the polypropylene resin preferably contains, based on the total amount (100 wt. %) of the polypropylene resins, 50 to 90 wt. % of polypropylene resin A and 50 to 10 wt. % of polypropylene resin B, more preferably 55 to 85 wt. % of polypropylene resin A and 45 to 15 wt. % of polypropylene resin B, and particularly preferably 60 to 80 wt. % of polypropylene resin A and 40 to 20 wt. % of polypropylene resin B.

It is considered preferable that the polypropylene resin contains the polypropylene resins A and B for the following reason. Due to the differences between the polypropylene resins A and B regarding the weight average molecular weight, Mw/Mn, and differential distribution value difference, that is, the difference in the formation of molecular weight distribution, the polypropylene resins A and B have slightly different quantitative relationships between high-molecular-weight components and low-molecular-weight components, and thus a polypropylene film obtained from a mixture of resins A and B has a certain type of finely mixing (phase separation) state, and the crystal size can be easily reduced. Further, it is considered preferable that the polypropylene resin contains the polypropylene resins A and B because high orientation tends to be easily obtained even at the same stretch ratio, and it is easy to obtain a finely roughened surface. When the polypropylene resin contains both the polypropylene resins A and B, the present invention is considered to exhibit excellent effects for the reasons described above; however, these reasons do not limit the present invention.

It is preferable that the polypropylene resin of the present invention contains both the polypropylene resins A and B, because the crystallite size, birefringence ΔNyz, and surface protrusion volume described above can be easily satisfied.

The polypropylene resin of the present invention can contain, and preferably contains, a long-chain branched polypropylene (a branched polypropylene; hereinafter also referred to as "polypropylene resin C") for the purpose of enhancing the surface smoothness and heat resistance.

In the present invention, the polypropylene resin C is not particularly limited, as long as it is a polypropylene generally called "a long-chain branched polypropylene" and has a long-chain branch, and the biaxially stretched polypropylene film for capacitors targeted by the present invention can be obtained. Specific examples of the polypropylene resin C include Profax PF-814, PF-611, and PF-633 (all of which are produced by Basell); Daploy HMS-PP (e.g., WB130HMS, WB135HMS, and WB140HMS; all of which are produced by Borealis); and the like.

The melt flow rate (MFR) of the polypropylene resin C at 230° C. is preferably 1 g/10 min or more and 20 g/10 min or less, and more preferably 1.5 g/10 min or more and 10 g/10 min or less, in terms of film-forming properties.

Moreover, branched chain molecules tend to have a higher melt tension; however, the melt tension of the polypropylene resin C used in the present invention is preferably 1 cN or more and 50 cN or less, and more preferably 10 cN or more and 40 cN or less.

The polypropylene resin may contain the polypropylene resin C in an amount, of 5.0 wt. % or less, more preferably 0.5 wt. % or more and 5.0 wt. % or less, even more preferably 1.0 wt. % or more and 4.0 wt. % or less, and particularly preferably 1.5 wt. % or more and 2.5 wt. % or less. It is preferable that the polypropylene resin C is contained, because the surface of the obtained film is appropriately smoothed, and the melting point of the film can be increased by several degrees, thereby increasing the heat resistance.

When the polypropylene resin contains the polypropylene resins A to C, the polypropylene resin preferably contains, based on the total amount (100 wt. %) of the polypropylene resins, 55 to 90 wt. % of polypropylene resin A, 10 to 45 wt. % of polypropylene resin B, and 5 wt. % or less of polypropylene resin C; more preferably 55 to 89.5 wt. % of polypropylene resin A, 10 to 44.5 wt. % of polypropylene resin 16, and 0.5 to 5.0 wt. % of polypropylene resin C; particularly preferably 60 to 84.0 wt. % of polypropylene resin A, 15 to 39.0 wt. % of polypropylene resin B, and 1.0 to 4.0 wt. % of polypropylene resin C; and further particularly preferably 60 to 78.5 wt. % of polypropylene resin A, 20 to 38.5 wt. % of polypropylene resin B, and 1.5 to 2.5 wt. % of polypropylene resin C.

The polypropylene resin of the present invention can contain polypropylene resins (hereinafter also referred to as "other polypropylene resins") other than polypropylene resins A to C. The "other polypropylene resins" are not particularly limited, as long as they are generally called polypropylene resins, and the biaxially stretched polypropylene film for capacitors targeted by the present invention can be obtained. The polypropylene resin of the present invention can contain such other polypropylene resins in an amount that does not adversely affect the biaxially stretched polypropylene film for capacitors targeted by the present invention.

The polypropylene resin of the present invention can further contain resins (hereinafter also referred to as "other resins") other than polypropylene resins. The "other resins" are not particularly limited, as long as they are generally called resins other than polypropylene resins, and the biaxially stretched polypropylene film for capacitors targeted by the present invention can be obtained. Examples of other resins include polyolefins other than polypropylenes, such as polyethylene, poly(1-butene), polyisobutene, poly(1-pentene), and poly(1-methylpentene); copolymers of α-olefins, such as ethylene-propylene copolymers, propylene-butene copolymers, and ethylene-butene copolymers; vinyl monomer-diene monomer random copolymers, such as styrene-butadiene random copolymers; vinyl monomer-diene monomer-vinyl monomer random copolymers, such as styrene-butadiene-styrene block copolymers; and the like. The polypropylene resin of the present invention can contain such other resins in an amount that does not adversely affect the biaxially stretched polypropylene film for capacitors targeted by the present invention. In general, the polypropylene resin may contain other resins in an amount of preferably 10 parts by weight or less, and more preferably 5 parts by weight or less, based on 100 parts by weight of the polypropylene resin.

The polypropylene resin (containing the polypropylene resins A, B, and C) of the present invention can generally be produced by a known polymerization method. The method is not particularly limited, as long as the polypropylene resin of the present invention can be produced. Examples of such polymerization methods include vapor phase polymerization, block polymerization, and slurry polymerization.

The polymerization may be single-stage (one-step) polymerization using a single polymerization reactor, or multistage polymerization using at least two or more polymerization reactors. Moreover, the polymerization may be carried out by adding hydrogen or a comonomer to the reactor as a molecular weight modifier.

The catalyst used is generally a known Ziegler-Natta catalyst, and is not particularly limited as long as the polypropylene resin of the present invention can be obtained. Moreover, the catalyst may contain a co-catalyst component and a donor. The molecular weight, molecular weight distribution, stereoregularity, etc., can be controlled by adjusting the catalyst and the polymerization conditions.

The "difference in the differential distribution values" can be adjusted to a desired value by, for example, adjusting the polymerization conditions to adjust the molecular weight distribution, using a decomposition agent to selectively decompose high-molecular-weight components, or mixing resins having different molecular weights.

When the formation of molecular weight distribution is controlled by the polymerization conditions, it is preferable to adjust the polymerization catalyst and use a multistage polymerization reaction, etc., because it is possible to easily adjust the formation of molecular weight distribution and molecular weight. An example of a method that uses a multistage polymerization reaction is described below.

The polymerization is carried out at a high temperature in the presence of a catalyst using a plurality of reactors, including a high-molecular-weight polymerization reactor, and a low-molecular-weight or intermediate-molecular-weight polymerization reactor. The amounts of high-molecular-weight components and low-molecular-weight components of the formed resin can be adjusted regardless of the order of the reactors. First, in a first polymerization step, propylene and a catalyst are supplied to a first polymerization reactor. Together with these components, hydrogen as a molecular weight modifier is mixed in an amount, necessary to attain a required polymer molecular weight. In the case of slurry polymerization, for example, the reaction temperature is about 70 to 100° C., and the residence time is about 20 to 100 minutes. The plurality of reactors can be used in series, for example. In that case, the polymerization product of the first step is continuously sent to the next reactor together with additional propylene, catalyst, and molecular weight modifier. Subsequently, second polymerization is carried out to adjust the molecular weight lower or higher than that of the first polymerization step. The yield (production output) of the first and second reactors can be adjusted to control the composition (structure) of high-molecular-weight components and low-molecular-weight components.

The catalyst used is preferably a general Ziegler-Natta catalyst. The catalyst may contain a co-catalyst component and a donor. The molecular weight distribution can be controlled by suitably adjusting the catalyst and the polymerization conditions.

When the formation of molecular weight distribution of the polypropylene raw resin is adjusted by peroxide decomposition, peroxide treatment using a decomposing agent, such as hydrogen peroxide or organic oxide, is preferred.

It is known that when a peroxide is added to a disintegration-type polymer, such as polypropylene, a reaction of extracting hydrogen from the polymer occurs, and that some of the resulting polymer radicals are recombined and undergo a crosslinking reaction, while most of the radicals undergo secondary decomposition (β cleavage) to be divided into two polymers having a lower molecular weight. Accordingly, decomposition of high-molecular-weight components proceeds with a high probability, thereby increasing the amount of low-molecular weight components. Thus, the formation of molecular weight distribution can be adjusted. An example of the method that can obtain a resin containing a suitable amount of low-molecular-weight components by peroxide decomposition is described below.

About 0.001 mass % to 0.5 mass % of organic peroxide, such as 1,3-bis(tertiary-butylperoxideisopropyl)-benzene, is added to a polymer powder or pellets of a polypropylene resin obtained by polymerization while taking into consideration the target composition (structure) of high-molecular-weight components and low-molecular-weight components, followed by melting and kneading in a melt-kneader at about 180° C. to 300° C.

When the content of low-molecular-weight components is adjusted by blending (resin mixing), it is preferable that at least two or more resins having different molecular weights are dry-mixed or melt-mixed.

In general, a mixed system of two types of polypropylenes obtained by mixing a primary resin with about 1 to 40 mass % of an additional resin having an average molecular weight higher or lower than that of the primary resin is preferably used, because it facilitates the adjustment of the amount of low-molecular-weight components.

In addition, in the case of the adjustment by mixing, the melt flow rate (MFR) can be used as an indicator of the average molecular weight. In this case, the MFR difference between the primary resin and the additional resin is preferably about 1 to 30 g/10 min, in terms of convenience during adjustment.

The method for mixing the plural polypropylene raw material resins (primary polypropylene resin A, additional polypropylene resin B, etc.) of the present invention is not particularly limited. Examples of the method include a method comprising dry-blending a polymer powder or pellets using a mixer etc.; and a method comprising supplying a polymer powder or pellets of the primary polypropylene resin A, additional polypropylene resin B, etc., to a kneader, followed by melting and kneading to thereby obtain a blended resin. Either of these methods can be used.

The mixer and kneader are not particularly limited. The kneader can be any of a single-screw type kneader, a two-screw type kneader, or a multi-screw type kneader having three or more screws. When a kneader having two or more screws is used, the type of kneading may be rotation in the same direction or different directions.

In the case of blending by melting and kneading, the kneading temperature is not particularly limited, as long as favorable kneading is obtained; however, the temperature is generally within a range of 200° C. to 300° C., and preferably 230° C. to 270° C. An overly high kneading temperature is not preferable, because this leads to the degradation of the resin. In order to prevent resin degradation during kneading and mixing, the kneader may be purged with an inert gas, such as nitrogen. The molten kneaded resin can be pelletized into a suitable size using a commonly known pelletizer to thereby obtain mixed polypropylene raw material resin pellets.

The total ash content derived from polymerization catalyst residues etc. contained in the polypropylene raw material resin of this embodiment is preferably as low as possible, in order to improve electrical characteristics. The total ash content is preferably 50 ppm or less, more preferably 40 ppm or less, and particularly preferably 30 ppm or less, based on 100 parts by weight of the polypropylene resin.

Thus, the crystallite size was reduced, and orientation was increased to thereby prevent leakage current when a high voltage was applied, and to prevent Joule heating, so that structural damage was less likely to occur; therefore, the voltage resistance (high dielectric breakdown voltage) and the durability during long-term application of a high voltage could be improved. Moreover, adjusting the protrusion volume to obtain a finely roughened surface within the range of the present invention allowed uniform contact between the films. Therefore, the voltage resistance and the durability when a high voltage was applied for a long period of time could also be improved.

The polypropylene resin of the present invention may further contain additives. The "additives" are not particularly limited, as long as they are generally used for polypropylene resins, and the biaxially stretched polypropylene film for capacitors targeted by the present invention can be obtained. Examples of additives include necessary stabilizing agents, such as antioxidants, chlorine absorbers, and ultraviolet absorbers; lubricants, plasticizers, flame-retardant agents, antistatic agents, etc. The polypropylene resin of the present invention can contain such additives in an amount that does not adversely affect the biaxially stretched polypropylene film for capacitors targeted by the present invention.

The "antioxidants" are not particularly limited, as long as they are generally called antioxidants and used for polypropylene, and the biaxially stretched polypropylene film for capacitors targeted by the present invention can be obtained. Antioxidants are generally used for two purposes. One purpose is to suppress thermal degradation and oxidation degradation in the extruder, and the other purpose is to contribute to suppression of degradation due to long-term, use as a capacitor film and improvement of capacitor performance. The antioxidant that suppresses the thermal degradation and oxidation degradation in the extruder is also referred to as the "primary agent," and the antioxidant that contributes to improvement of capacitor performance is also referred to as the "secondary agent."

Two types of antioxidants may be used for the two purposes, or one type of antioxidant may be used for the two purposes.

When two types of antioxidants are used, the polypropylene resin may contain a primary agent, such as 2,6-di-tertiary-butyl-para-cresol (generic name: BHT), in an amount of about 1000 ppm to 4000 ppm based on 100 parts by weight of the polypropylene resin. The antioxidant used for this purpose is mostly consumed in the molding step in the extruder, and hardly remains in the formed film (the remaining amount is generally less than 100 ppm).

A usable secondary agent is a hindered phenol-based antioxidant having a carbonyl group.

The "hindered phenol-based antioxidant having a carbonyl group" is not particularly limited, as long as it is generally called a hindered phenol-based antioxidant having a carbonyl group, and the biaxially stretched polypropylene film for capacitors targeted by the present invention can be obtained.

Examples of the hindered phenol-based antioxidant having a carbonyl group include triethylene glycol-bis[3-(3-tertiary-butyl-5-methyl-4-hydroxyphenyl)propionate] (trade name: Irganox 245), 1,6-hexanediol-bis[3-(3,5-di-tertiary-butyl-4-hydroxyphenyl)propionate] (trade name: Irganox 259), pentaerythrityl tetrakis[3-(3,5-di-tertiary-butyl-4-hydroxyphenyl)propionate] (trade name: Irganox 1010), 2,2-thio-diethylenebis[3-(3,5-di-tertiary-butyl-4-hydroxyphenyl)proprionate (trade name: Irganox 1035), octadecyl-3-(3,5-di-tertiary-butyl-4-hydroxyphenyl)propionate (trade name: Irganox 1076), N,N'-hexamethylenebis(3,5-di-tertiary-butyl-4-hydroxy-hydrocinnamide) (trade name: Irganox 1098), and the like. The most preferable among these is pentaerythrityl tetrakis[3-(3,5-tertiary-butyl-4-hydroxyphenyl)propionate], which has a high molecular weight, high compatibility with polypropylene, low volatility, and excellent heat resistance.

The polypropylene resin preferably contains a hindered phenol-based antioxidant having a carbonyl group in an amount of 5000 ppm by mass or more and 7000 ppm by mass or less, and more preferably 5500 ppm by mass or more and 7000 ppm by mass or less, based on 100 parts by weight of the polypropylene resin.

This is because a considerable amount of the hindered phenol-based antioxidant having a carbonyl group is also consumed in the extruder.

When the polypropylene resin does not contain a primary agent, a larger amount of hindered phenol-based antioxidant having a carbonyl group can be used. Since the consumption of the hindered phenol-based antioxidant having a carbonyl group in the extruder increases, it is preferable that the polypropylene resin contains the hindered phenol-based antioxidant having a carbonyl group in an amount of 6000 ppm by mass or more and 8000 ppm by mass or less, based on 100 parts by weight of the polypropylene resin.

The biaxially stretched polypropylene film for capacitors of the present invention contains one or more types of hindered phenol-based antioxidants having a carbonyl group (secondary agent) for the purpose of suppressing degradation that proceeds with time during a long period of use. The content of the one or more antioxidants in the film is preferably 4000 ppm by mass or more and 6000 ppm by mass or less, and more preferably 4500 ppm by mass or more and 6000 ppm by mass or less, based on 100 parts by weight of the polypropylene resin. In terms of development of appropriate effects, the content of the one or more antioxidants in the film is preferably 4000 ppm by mass or more and 6000 ppm by mass or less.

A capacitor film containing a specific optimal amount of hindered phenol-based antioxidant having a carbonyl group, which is molecularly compatible with polypropylene, is preferable, because while maintaining high voltage resistance performance resulting from the above-mentioned internal structure (crystallite size, orientation (birefringence), and surface roughness (protrusion volume)), the capacitance is not reduced (degradation does not proceed) for a long period of time (longer than 100 hours) even in an accelerated life test at a very high temperature of 110° C. or more, and the long-term durability is improved.

The polypropylene resin undergoes considerable thermal degradation (oxidative degradation) and shear degradation during the film-forming step (particularly in the extruder). The degree of progression of degradation, i.e., changes in the molecular weight, distribution and stereoregularity, can be suppressed by nitrogen purge of the inside of the extruder (inhibition of oxidation), the shape of the screw in the extruder (shear force), the internal shape of the T-die during casting (shear force), the amount of the antioxidant added (inhibition of oxidation), the winding speed during casting (elongation force), etc.

The "chlorine absorber" is not particularly limited, as long as it is generally called a chlorine absorber and used for polypropylene, and the biaxially stretched polypropylene film for capacitors targeted by the present invention can be obtained. Examples of the chlorine absorber include metal soaps, such as calcium stearate.

The "unstretched cast sheet" for producing the biaxially stretched polypropylene film of the present invention can be molded by a known method. For example, polypropylene resin pellets, dry-mixed polypropylene resin pellets (and/or a polymer powder), or mixed polypropylene resin pellets prepared by melt-kneading beforehand are supplied to an extruder, heated and melted, passed through a filtration filter, heated and melted at 170° C. to 320° C., preferably 200° C. to 300° C., molten-extruded from a T-die, and cooled and solidified by at least one metal drum maintained at 80° C. to 140° C., thereby forming an unstretched cast sheet.

When the temperature of the group of metal drums is maintained at 80° C. to 140° C., preferably 90° C. to 120° C., and more preferably 90° C. to 105° C. during molding of the unstretched cast sheet, the β-crystal fraction of the obtained cast sheet determined by an X-ray method is about 1% or more and 50% or less, preferably about 5% or more and 30% or less, and more preferably about 5% or more and 20% or less. It should be noted that this value is a value when no β-crystal nucleating agent is contained.

The above range of β-crystal fraction is preferable because physical properties, i.e., capacitor properties and element-winding processability, can both be satisfied.

The β-crystal fraction is obtained by X-ray diffraction intensity measurement. This value can be calculated by the method described in "A. Turner-Jones, et al., Makromol. Chem., Vol. 75, p. 134 (1964)," and is referred to as the K value. More specifically, the proportion of β crystals is expressed by the ratio of the sum of three diffraction peak heights derived from α crystals, and a single diffraction peak height derived from β crystals.

The thickness of the cast sheet is not particularly limited, as long as the biaxially stretched polypropylene film for capacitors targeted by the present invention can be obtained. In general, the thickness is preferably 0.05 mm to 2 mm, and more preferably 0.1 mm to 1 mm.

The biaxially stretched polypropylene film for capacitors of the present invention can be produced by stretching the polypropylene cast sheet. Stretching is preferably biaxial stretching that causes orientation along longitudinal and lateral axes. The stretching method is preferably a sequential biaxial stretching method. In the sequential biaxial stretching method, the cast sheet is first maintained at a temperature of 100° C. to 160° C., and stretched by a factor of 3 to 7 in the machine direction by passing the sheet between rolls having different speeds, and the sheet is immediately cooled to room, temperature. The appropriate adjustment of the temperature of this longitudinal stretching step causes β crystals to be melted and transformed to α crystals, and irregularities are thereby actualized. Subsequently, the stretched film is guided to a tenter and stretched by a factor of 3 to 11 in the width direction at a temperature of 160° C. or more. Then, the film is relaxed, solidified by heat, and wound.

The wound film is subjected to aging treatment at a temperature of about 20° C. to 45° C., and cut to a desired product width.

According to this stretching step, the film has excellent mechanical strength and rigidity, and surface irregularities are more clarified. Thus, a finely surface-roughened stretched film is obtained.

The surface of the film of the present invention is preferably imparted with suitable surface roughness that results in favorable capacitor properties while improving the winding suitability.

The surface of the biaxially stretched polypropylene film of the present invention is preferably finely roughened in such a manner that at least one side of the film has a surface roughness such that the center line average roughness (Ra) is 0.03 µm or more and 0.08 µm or less, and the maximum height (Rz; Rmax as formerly defined in JIS) is 0.3 µm or more and 0.8 µm or less.

When Ra and Rz are within the above preferable range, the surface can be a finely roughened surface. In capacitor processing, winding wrinkles are less likely to be formed in element-winding processing, and the film can be preferably wound. Further, since uniform contact can be formed between the films, the voltage resistance and the long-term voltage resistance can also be improved.

In the present invention, "Ra" and "Rz" (Rmax as formerly defined in JIS) refer to values measured by a commonly and widely used stylus-type surface roughness tester (e.g., a stylus-type surface roughness tester using a diamond stylus or the like) according to the method defined, for example, in JTS-B0601:2001. More specifically, "Ra" and "Rz" (Rmax as formerly defined in JIS) can be determined by, for example, using a Surfcom 1400D-3DF-12 three-dimensional surface roughness meter (produced by Tokyo Seimitsu Co., Ltd.) according to the method defined in JIS-B 0601: 2001.

Various known surface-roughening methods, such as embossing and etching, can be used to impart fine irregularities to the film surface. Preferred among these is a surface-roughening method using β crystals, which does not require mixing of impurities. The proportion of β crystals can be generally controlled by changing the cast temperature and cast speed. Moreover, the melting/transformation ratio of β crystals can be controlled by the roll temperature in the longitudinal stretching step. The finely roughened surface properties can be obtained by selecting the optimum production conditions for two parameters, i.e., β-crystal formation and melting/transformation.

In the biaxially stretched polypropylene film for capacitors of the present invention, corona discharge treatment may be carried out online or offline after completion of the stretching and thermal solidification step, for the purpose of enhancing adhesive properties in a subsequent step, such as a metal deposition processing step. Corona discharge treatment can be performed by a known method. The treatment is preferably performed in an atmospheric gas, such as air, carbon dioxide gas, nitrogen gas, or a mixed gas thereof.

The biaxially stretched polypropylene film for capacitors of the present invention can be provided with an electrode, in order to process the film as a capacitor. Such an electrode is not particularly limited, as long as the capacitor targeted by the present invention can be obtained. Any electrode generally used to produce a capacitor can be used. Examples of the electrode include metal foil, paper having at least one metallized surface, plastic films, and the like.

Since capacitors are required to have a smaller size and a lighter weight, it is preferable that one side or both sides of the film of the present invention is directly metallized to form an electrode or electrodes. Examples of usable metals include single metals, such as zinc, lead, silver, chromium, aluminum, copper, and nickel; mixtures of several kinds of these metals; alloys thereof; and the like. In consideration of the environment, economical efficiency, capacitor performance, etc., zinc and aluminum are preferable.

Examples of the method for directly metallizing the surface of the biaxially stretched polypropylene film for capacitors of the present invention include vacuum deposition and sputtering. The method is not particularly limited, as long as the capacitor targeted by the present invention can be obtained. Vacuum deposition is preferable, in terms of productivity, economical efficiency, etc. General examples of vacuum deposition include a crucible method, a wire method, and the like; however, the method is not particularly limited, as long as the capacitor targeted by the present invention can be obtained. An optimal method can be suitably selected.

The margin pattern during metallization by deposition is not particularly limited. In terms of improving capacitor properties, such as storage stability, it is preferable that a pattern containing a so-called special margin, such as a fishnet pattern and/or a T-margin pattern, is applied to one surface of the film of the present invention, because the storage stability is enhanced, and it is effective in terms of preventing the breakage and short-circuit of the capacitor.

The method for forming a margin can be a commonly known method, such as a tape method or an oil method, which can be used with no restrictions.

The biaxially stretched polypropylene film for capacitors of the present invention has high initial voltage resistance and excellent long-term voltage resistance. Further, the finely roughened surface of the film contributes to excellent element-winding suitability. Moreover, high capacitance is easily exhibited because the film can be made very thin. Therefore, the biaxially stretched polypropylene film for capacitors of the present invention can be very preferably used for small capacitors with a high capacitance of 5 µF or more, preferably 10 µF or more, and more preferably 20 µF or more.

EXAMPLES

Next, the present invention is described in more detail with reference to Examples; however, these Examples are provided for explaining the present invention, and do not limit the present invention. The terms "parts" and "%" in the Examples indicate "parts by weight" and "% by weight," respectively, unless specifically indicated otherwise.

Polypropylene Resins

Polypropylene resins used to produce polypropylene films of the Examples and Comparative Examples are shown below.

Polypropylene resins A1 to A'4 shown in Table 1 are available from Prime Polymer Co., Ltd., and a polypropylene resin B1 is available from Korea Petro Chemical Ind. Co., Ltd. The polypropylene resins A1 and A2 correspond to the polypropylene resin A, and the polypropylene resin B1 corresponds to the polypropylene resin B.

Further, the long-chain branched polypropylene (polypropylene resin C) used was a long-chain branched polymer WB135HMS (produced by Borealis; hereinafter referred to as "polypropylene resin C1"), which has a melt flow rate (MFR) of 2.4 g/10 min and a melt tension of 32 cN.

Table 1 shows the weight average molecular weight (Mw), molecular weight distribution (Mw/Mn), molecular weight distribution (Mz/Mn), differential distribution value difference, and mesopentad fraction ([mmmm]) of the polypropylene resins A1 to A'4 and B1.

These values are obtained from the resins in the form of raw material resin pellets. All of the polypropylene resins A1 to A'4 and B1 contain 2000 ppm of 2,6-di-t-butyl-p-cresol (generic name: BHT) as an antioxidant (primary agent), and 5000 to 6500 ppm of pentaerythrityl tetrakis[3-(3,5-di-t-butyl-4-hydroxyphenyl)propionate] (trade name: Irganox 1010) as a hindered phenol-based antioxidant having a carbonyl group (secondary agent).

Measurement of Weight Average Molecular Weight (Mw), Molecular Weight Distribution (Mw/Mn), Molecular Weight Distribution (Mz/Mn), and Differential Distribution Value of Polypropylene Resins The molecular weight (Mw), molecular weight distribution (Mw/Mn), and differential distribution values of a distribution curve of the polypropylene resins were measured by GPC (gel permeation chromatography) under the following conditions.

A HLC-8121GPC-HT high-temperature GPC apparatus with a built-in differential refractometer (RI) (produced by Tosoh Corporation) was used. Three coupled TSKgel GMHHR-H(20)HT columns (produced by Tosoh Corporation) were used. The column temperature was 140° C., and trichlorobenzene was flown as an eluent at a flow rate of 1.0 ml/min. A calibration curve was prepared using polystyrene standard produced by Tosoh Corporation, the measured molecular weight values were converted into polypropylene values, and Z-average molecular weight (Mz), weight average molecular weight (Mw), and number average molecular weight (Mn) were obtained. Mz and Mn were used to obtain a molecular weight distribution (Mz/Mn), and Mw and Mn were used to obtain a molecular weight distribution (Mw/Mn).

Differential distribution values were obtained in the following manner. First, a time curve (elution curve) of intensity distribution detected by an RI detector was converted into a distribution curve with respect to the molecular weight M (Log(M)) of the above polystyrene standard using the calibration curve produced using the polystyrene standard. Next, after an integral distribution curve with respect to Log(M) when the total area of the distribution curve was regarded as 100% was obtained, the integral distribution curve was differentiated by Log(M) to thereby obtain a differential distribution curve with respect to Log(M). Differential distribution values when Log(M)=4.5 and when Log(M)=6.0 were read from this differential distribution curve. The series of operations until the differential distribution curve was obtained was carried out using analysis software provided in the GPC measurement apparatus.

Measurement of Mesopentad Fraction ([mmmm])

The polypropylene resins were each dissolved in a solvent, and the mesopentad fraction ([mmmm]) was determined under the following conditions using a high-temperature Fourier transform nuclear magnetic resonance system (high-temperature FT-NMR).

Measurement instrument: High-temperature FT-NMR JNM-ECP500, produced by JEOL Ltd.
Observed nucleus: $^{13}$C (125 MHz)
Measurement temperature: 135° C.
Solvent: Ortho-dichlorobenzene (ODCB; a mixed solvent of ODCB and deuterated ODCB (4/1))
Measurement mode: Single-pulse proton broadband decoupling
Pulse width: 9.1 μsec (40° pulse)
Pulse interval: 5.5 sec
Number of integrations: 4500
Shift reference: $CH_3$ (mmmm)=21.7 ppm The mesopentad fraction was calculated as the percentage (%) of the integrated value of the intensity of each signal derived from a combination of pentads (e.g., "mmmm" or "mrrm"). Regarding the assignment of each signal derived from "mmmm," "mrrm," or the like, a reference was made to, for example, the description of spectra in "T. Hayashi, et al., Polymer, Vol. 29, p. 138 (1988)."

TABLE 1

| Polypropylene | Molecular weight Mw/$10^5$ | Molecular weight distribution Mw/Mn | Molecular weight distribution Mz/Mn | Differential distribution value difference (%) | Stereoregularity (NMR) [mmmm] (%) |
|---|---|---|---|---|---|
| Resin A1 | 3.4 | 10.0 | 45.5 | 10.2 | 95.1 |
| Resin A2 | 2.7 | 8.0 | 27.2 | 13.6 | 95.0 |
| Resin A'3 | 2.7 | 6.2 | 16.8 | 7.5 | 96.5 |
| Resin A'4 | 2.9 | 4.0 | 10.4 | 4.6 | 94.0 |
| Resin B1 | 3.5 | 8.0 | 34.8 | 7.0 | 96.5 |

The above polypropylene resins were used to produce polypropylene films of Examples 1 to 6 and Comparative Examples 1 to 4, and the physical properties of the films were evaluated.

Example 1

Dry-blended pellets obtained by continuously weighing and mixing the resin A1 (5000 ppm of Irganox 1010 was added as an antioxidant) and the resin B1 (5000 ppm of Irganox 1010 was added as an antioxidant) at a mass ratio (A1/B1) of 65/35 were supplied to an extruder. After the dry-blended pellets were melted at a temperature of 250° C., the melted product was extruded through a T-die, and solidified by winding the product on a metal drum with a surface temperature maintained at 92° C., thereby producing a cast sheet having a thickness of about 125 μm. The cast sheet was stretched at a temperature of 140° C. in the machine direction by a factor of 5, and immediately cooled to room temperature. Then, the sheet was stretched by a tenter at a temperature of 165° C. in the transverse direction by a factor of 10, thereby obtaining a very thin biaxially stretched polypropylene film having a thickness of 2.5 μm. Table 2 summarizes the amount of each resin and the physical property values of the obtained film.

Example 2

A very thin biaxially stretched polypropylene film having a thickness of 2.5 μm was obtained in the same manner as in Example 1, except that the mass ratio of resin A1 to resin B1 (A1/B1) was changed to 75/25.

Table 2 summarizes the amount of each resin and the physical property values of the obtained film.

Example 3

A very thin biaxially stretched polypropylene film having a thickness of 2.5 μm was obtained in the same manner as in Example 1, except that the mass ratio of resin A1 to resin B1 (A1/B1) was changed to 85/15.

Table 2 summarizes the amount of each resin and the physical property values of the obtained film.

Example 4

A very thin biaxially stretched polypropylene film having a thickness of 2.5 μm was obtained in the same manner as in Example 1, except that the mass ratio of resin A1 to resin B1 (A1/B1) was changed to 50/50.

Table 2 summarizes the amount of each resin and the physical property values of the obtained film.

Example 5

A very thin biaxially stretched polypropylene film having a thickness of 2.5 μm was obtained in the same manner as in Example 1, except that dry-blended pellets obtained by continuously weighing and mixing the resins A1 and B1, and further the resin C1 (5000 ppm of Irganox 1010 was added as an antioxidant) at a mass ratio (A1/B1/C1) of 64/34/2 were supplied to an extruder, and the surface temperature of the cast metal drum was changed to 99° C.

Table 2 summarizes the amount of each resin and the physical property values of the obtained film.

Example 6

A very thin biaxially stretched polypropylene film having a thickness of 2.5 μm was obtained in the same manner as in Example 5, except that the resin A2 (5000 ppm of Irganox 1010 was added as an antioxidant) was used in place of the resin A1.

Table 2 summarizes the amount of each resin and the physical property values of the obtained film.

Comparative Example 1

A very thin biaxially stretched polypropylene film having a thickness of 2.5 μm was obtained in the same manner as in Example 1, except that the resin A1 was used alone, and the surface temperature of the cast metal drum was changed to 100° C.

Table 2 summarizes the amount of the resin and the physical property values of the obtained film.

Comparative Example 2

A very thin biaxially stretched polypropylene film, having a thickness of 2.5 μm was obtained in the same manner as in Example 1, except that the resin A'3 (5000 ppm of Irganox 1010 was added as an antioxidant) was used alone, and the surface temperature of the cast metal drum was changed to 92° C.

Table 2 summarizes the amount of the resin and the physical property values of the obtained film.

Comparative Example 3

A very thin biaxially stretched polypropylene film having a thickness of 2.5 μm was obtained in the same manner as in Example 1, except that dry-blended pellets were obtained by continuously weighing and mixing the resin A'3 and the resin A'4 (5000 ppm of Irganox 1010 was added as an antioxidant) at a mass ratio (A'3/A'4) of 80/20, and the surface temperature of the cast metal drum was changed to 95° C.

Table 2 summarizes the amount of each raw material resin and the physical property values of the obtained film.

Comparative Example 4

A very thin biaxially stretched polypropylene film having a thickness of 2.5 μm was obtained in the same manner as in Example 1, except that the mass ratio of resin A1 to resin B1 (A1/B1) was changed to 25/75.

Table 2 summarizes the amount of each resin and the physical property values of the obtained film.

Methods for Measuring Characteristic Values, Etc.

The methods for measuring characteristic values, etc., in the Examples and Comparative Examples are described below.

Measurement of Crystallite Size

The crystallite size of each biaxially stretched polypropylene film was measured using an XRD (wide angle X-ray diffraction) apparatus in the following manner.

Measurement instrument: MiniFlex300 (produced by Rigaku Corporation) desktop X-ray diffractometer X-ray generation output: 30 kV, 10 mA Irradiated X-rays: monochromatized CuKα rays (wavelength: 1.5418 Å)

Detector: scintillation counter

Goniometer scanning: 2θ/θ continuous scanning

The half width of the diffraction reflection peak from (040) plane of α-crystal was determined from the obtained data using an analytical computer and using PDXL, integrated X-ray powder diffraction software originally bundled with the apparatus.

The crystallite size was determined from the obtained half width of the diffraction reflection peak from (040) plane of α-crystal using the following Scherrer's equation (1). The shape factor constant K used in the present invention was 0.94.

$$D = K \times \lambda / (\beta \times \cos \theta) \qquad \text{Equation (1):}$$

wherein D is the crystallite size (Å), K is the constant (shape factor), λ is the wavelength (Å) of the X-rays used, β is the determined half width, and θ is the diffraction Bragg angle.

Measurement of Birefringence

The value of birefringence ΔNyz of each biaxially stretched polypropylene film was calculated from the retardation (phase difference) measured by a gradient method, as described below.

Measurement instrument: RE-100 retardation measuring device (produced by Otsuka Electronics Co., Ltd.)

Light source: LED light source with a wavelength of 550 nm

Measurement method: The angular dependence of the retardation value was measured by the following gradient method. The main axes in the in-plane direction of the film were regarded as the x-axis and the y-axis, and the thickness direction (normal direction relative to the in-plane direction) of the film was regarded as the z-axis. Of the in-plane direction axes, the slow axis having a higher refractive index was regarded as the x-axis, and a retardation value when the x-axis, which served as an inclined axis, was inclined within the range of 0° to 50° relative to the z-axis was determined.

Using the obtained retardation value, the birefringence ΔNyz in the y-axial direction with respect to the thickness direction (z-axial direction) was calculated according to the non-patent document "Yutaka AWAYA, Guide for polarization microscope of high-molecular-weight material, pp. 105-120, 2001."

For example, in a sequential stretching method, when the stretch ratio in the TD direction (transverse direction) is higher than the stretch ratio in the MD direction (machine direction), the TD direction serves as the slow axis (x-axis), and the MD direction serves as the y-axis.

Measurement of Total Volume of Protrusions (Finely Roughened Surface)

The total volume of protrusions of the biaxially stretched polypropylene film was measured using "VertScan2.0 (model: R5500GML)" produced by Ryoka Systems Inc. as a light interferometric non-contact, surface profiler in WAVE mode using a 530 white filter and a ×20 objective lens in 10 randomly selected portions of the film surface in a visual field of 240 μm×180 μm. After the obtained data was subjected to noise cancellation processing by a median filter, Gaussian filtering with a cutoff value of 30 μm was performed to remove waviness components. The roughened surface was thereby brought into a state suitable for proper measurement.

The total volume of protrusions was determined in the following manner using the "Bearing" plug-in function of "VS-Viewer" analysis software of "VertScan2.0." More specifically, the "mountain-side height threshold" was set as a predetermined height (i.e., 0.02 μm), and then a value displayed as the "mountain-side volume" was the total volume of protrusions per visual field. This measurement was performed in 10 portions, and their average value was determined as the total volume of protrusions per visual field.

Film Thickness

The thickness of each biaxially stretched polypropylene film was measured by a micrometer (JIS-B7502) according to JIS-C2330.

Measurement of Antioxidant Content of Biaxially Stretched Polypropylene Films

The biaxially stretched polypropylene films were each cut, a solvent was added thereto, and the antioxidant remaining in the film was extracted by ultrasonic extraction.

The obtained extract was analyzed using a high-speed liquid chromatography and a UV detector, and the amount of the hindered phenol-based antioxidant having a carbonyl group (secondary agent) was measured. The content of the secondary agent was calculated based on the chromatographic peak intensity using the previously determined calibration curve.

Measurement of Surface Roughness

The center line average roughness (Ra) and Rz (Rmax as formerly defined in JIS) of each biaxially stretched polypropylene film were measured by a contact method using a Surfcom 1400D-3DF-12 three-dimensional surface roughness meter (produced by Tokyo Seimitsu Co., Ltd.) according to the method defined in JIS-B0601. Measurements were carried out three times, and their average value was obtained. Ra and Rz were measured by a contact method, and the reliability of each value was confirmed by a non-contact method, as necessary.

Production of Capacitor Elements

A T-margin deposition pattern was formed on each biaxially stretched polypropylene film by aluminum deposition at a deposition resistance of 12Ω/□ to thereby obtain a metallized film. After the film was formed into slits having a narrow width, two metallized films were superimposed, and wound for 1360 turns at a winding tension of 200 g using a 3KAW-N2 automatic winder (produced by Kaido Mfg. Co., Ltd.).

The wound element was subjected to heat treatment at 120° C. for 4 hours while being pressed, and the end surfaces of the element were sprayed with zinc metal to obtain a flat capacitor. The capacitance of the produced capacitor was 100 μF (±5 μF).

Dielectric Breakdown Voltage

The dielectric breakdown voltage was measured according to the B method (plate electrode method) of JIS C2330 (2001) 7.4.11.2 using a direct-current (dc) power source at 100° C. The average value of 32 measured values obtained by excluding the topmost 6 values and the bottommost 6 values from 44 measured average dielectric breakdown voltage values (kV) was used as the dielectric breakdown voltage (kV).

High-Temperature and Short-Term Voltage Resistance Test (Initial Voltage Resistance) of Capacitor Element First, the element was preheated beforehand at 105° C., and then the initial capacitance before the test was evaluated by an LCR Hi-Tester 3522-50 (produced by Hioki E.E. Corp.). Next, a direct-current voltage of 1150 V was applied to the capacitor element in a nigh-temperature chamber at 105° C. for 1 minute. The capacitance of the element after that was measured by the LCR tester, and the capacitance change before and after voltage application was calculated. Next, the element was returned to the high-temperature chamber and subjected to the second voltage application, and the second capacitance change (cumulative) was determined. This operation was repeated four times. The fourth capacitance change was determined, and the average value of three elements was used for evaluation. It is preferable that the fourth capacitance change is ±10% or less.

Accelerated Life Test of Capacitor Element (Long-Term Voltage Resistance)

The element was preheated beforehand at 110° C., and then the initial capacitance before the test was evaluated by an LCR Hi-Tester 3522-50 (produced by Hioki E.E. Corp.). Next, a direct-current voltage of 800 V was continuously applied to the capacitor element in a high-temperature chamber at 110° C. for 100 hours. The capacitance of the element after 100 hours was measured by the LCR tester, and the capacitance change before and after voltage application was calculated. The capacitance change after 100 hours was evaluated by the average value of three elements. It is preferable that the capacitance change after 100 hours is ±10% or less.

Comprehensive Evaluation as Capacitor Films

Success or failure in the production of capacitor elements using films having a thickness of 6 μm or less, which is necessary to improve capacitance, and the suitability of the films as capacitor films, such as voltage resistance at a high temperature and high-temperature long-term durability, when the films were used as capacitor elements were comprehensively evaluated. Films improved from films based on the prior art were evaluated as "A," films equivalent to the prior art films were evaluated as "B," and films inferior to the prior art films were evaluated as "C."

TABLE 2

|  | Example | | | | | | Comparative Example | | | |
| --- | --- | --- | --- | --- | --- | --- | --- | --- | --- | --- |
|  | 1 | 2 | 3 | 4 | 5 | 6 | 1 | 2 | 3 | 4 |
| Resin A1 | 65 | 75 | 85 | 50 | 64 |  | 100 |  |  | 25 |
| Resin A2 |  |  |  |  |  | 64 |  |  |  |  |
| Resin A'3 |  |  |  |  |  |  |  | 100 | 80 |  |
| Resin A'4 |  |  |  |  |  |  |  |  | 20 |  |
| Resin B1 | 35 | 25 | 15 | 50 | 34 | 34 |  |  |  | 75 |
| Resin C1 |  |  |  |  | 2 | 2 |  |  |  |  |
| Crystallite size (Å) | 115 | 118 | 118 | 114 | 118 | 116 | 132 | 125 | 123 | 124 |
| Birefringence ($\Delta$Nyz/$10^{-3}$) | 7.93 | 8.70 | 9.04 | 7.14 | 8.12 | 8.42 | 5.85 | 4.30 | 4.24 | 6.12 |
| Protrusion volume ($\mu m^3$/visual field) | 82 | 75 | 70 | 193 | 29 | 20 | 327 | 214 | 184 | 192 |
| Thickness ($\mu m$) | 2.5 | 2.5 | 2.5 | 2.5 | 2.5 | 2.5 | 2.5 | 2.5 | 2.5 | 2.5 |
| Surface roughness |  |  |  |  |  |  |  |  |  |  |
| Ra ($\mu m$) | 0.05 | 0.05 | 0.04 | 0.07 | 0.04 | 0.03 | 0.08 | 0.06 | 0.05 | 0.09 |
| Rz ($\mu m$) | 0.70 | 0.62 | 0.58 | 0.82 | 0.47 | 0.36 | 1.07 | 0.89 | 0.75 | 0.95 |
| Antioxidant content (ppm) | 4200 | 4400 | 4300 | 4500 | 4700 | 4200 | 3500 | 3200 | 3600 | 3600 |
| Film dielectric breakdown voltage (kV) | 1.35 | 1.32 | 1.30 | 1.33 | 1.40 | 1.37 | 1.20 | 1.10 | 0.95 | 1.17 |
| Initial voltage resistance capacitance change (%) | −6 | −4 | −9 | −15 | −2 | −2 | <−50 | <−50 | <−50 | <−50 |
| Long-term voltage resistance capacitance change (%) | −10 | −8 | −9 | −25 | −4.5 | −5 | <−50 | <−50 | <−50 | <−50 |
| Comprehensive evaluation | A | A | A | B | A | A | C | C | C | C |

As is clear from Examples 1 to 6, the two characteristics, i.e., crystallite size and birefringence, of the biaxially stretched polypropylene films of the present invention are within a prescribed range. Further, the thickness of the films is very thin, and the dielectric breakdown voltage of the films at a high temperature is high. Therefore, capacitor elements produced from these films have excellent voltage resistance. Accordingly, the biaxially stretched polypropylene films of the present invention are suitable as films for capacitors.

Furthermore, as is clear from Examples 1 to 3, 5, and 6, the three characteristics, i.e., crystallite size, birefringence, and protrusion volume, of the biaxially stretched polypropylene films of the present invention are within a prescribed range. Further, the thickness of the films is very thin, and the dielectric breakdown voltage of the films at a high temperature is high. Therefore, capacitor elements produced from these films have excellent initial voltage resistance and long-term voltage resistance. Accordingly, the biaxially stretched polypropylene films of the present invention are extremely suitable as films for capacitors.

In particular, when the polypropylene resin contained a long-chain branched polypropylene (polypropylene resin C), the surface roughness was smaller. Therefore, the long-term voltage resistance was improved (Examples 5 and 6).

However, in Comparative Examples 1 to 4, the two characteristics, i.e., crystallite size and birefringence, were not within a prescribed range, and the voltage resistance and the long-term voltage resistance were inferior.

INDUSTRIAL APPLICABILITY

Since the biaxially stretched polypropylene film for capacitors of the present invention has excellent initial voltage resistance and long-term voltage resistance (long-term durability) at a high temperature, a capacitor produced using this film can have a longer life. Further, since the biaxially stretched polypropylene film for capacitors of the present invention can be made thinner, the film can be preferably used as a capacitor having a small size and a large capacitance, for which heat resistance is required.

The invention claimed is:

1. A biaxially stretched polypropylene film for capacitors, obtained by biaxially stretching a polypropylene resin,
   the polypropylene film having a crystallite size of 122 Å or less as determined by the Scherrer's equation from the half width of the reflection peak from (040) plane of α-crystal measured by a wide angle X-ray diffraction method, and
   the polypropylene film having a value of birefringence $\Delta$Nyz with respect to a thickness direction of $7.0 \times 10^{-3}$ or more and $10.0 \times 10^{-3}$ or less as measured by an optical birefringence measurement.

2. The biaxially stretched polypropylene film for capacitors according to claim 1,
   wherein the polypropylene film has protrusions, and
   when a surface shape measurement is carried out on at least one surface of the polypropylene film in a visual field of 240 $\mu m \times 180$ $\mu m$ by using a light interferometric non-contact surface profiler, the total volume of protrusions having a height of 0.02 $\mu m$ or more is 10 $\mu m^3$ or more and 120 $\mu m^3$ or less per visual field.

3. The polypropylene film according to claim 1, wherein the polypropylene resin contains a polypropylene resin A, and the polypropylene resin A has the following characteristics:
   a weight average molecular weight (Mw) of 250,000 or more and 450,000 or less;

a molecular weight distribution (Mw/Mn) of 7.0 or more and 12.0 or less;

a ratio of Z-average molecular weight/number average molecular weight (Mz/Mn) of 20.0 or more and 70.0 or less;

a difference, as obtained by subtracting a differential distribution value when the logarithmic molecular weight Log(M)=6.0 from a differential distribution value when Log(M)=4.5 on a molecular weight distribution curve, of 8.0% or more and 18.0% or less; and a mesopentad fraction ([mmmm]) of 94.0% or more and less than 98.0%.

4. The polypropylene film according to claim 3, wherein the polypropylene resin further contains a polypropylene resin B, and the polypropylene resin B has the following characteristics:

a Mw of 300,000 or more and 400,000 or less;

a Mw/Mn of 7.0 or more and 9.0 or less; and a difference, as obtained by subtracting a differential distribution value when the logarithmic molecular weight Log(M)=6.0 from a differential distribution value when Log(M)=4.5 on a molecular weight distribution curve, of 1.0% or more and less than 8.0%; and wherein the polypropylene resin B is contained in an amount of 10 wt. % or more and 45 wt. % or less, based on 100 wt. % of the entire polypropylene resin.

5. The polypropylene film according to claim 1, wherein the polypropylene film contains at least one hindered phenol-based antioxidant having a carbonyl group, and the content of the antioxidant in the film is 4,000 ppm by mass or more and 6,000 ppm by mass or less, based on 100 parts by weight of the polypropylene resin.

6. The polypropylene film according to claim 1, wherein at least one side of the polypropylene film has a surface roughness such that the center line average roughness (Ra) is 0.03 μm or more and 0.08 μm or less, and the maximum height (Rz) is 0.3 μm or more and 0.8 μm or less.

7. The polypropylene film according to claim 1, wherein the polypropylene film has a thickness of 1.0 μm or more and 6.0 μm or less.

8. A metallized polypropylene film for capacitors, comprising the biaxially stretched polypropylene film for capacitors according to claim 1, wherein a metal is deposited on one side or both sides of the polypropylene film.

9. A capacitor produced using the metallized polypropylene film for capacitors according to claim 8.

* * * * *